United States Patent
Lee et al.

(10) Patent No.: US 7,064,086 B2
(45) Date of Patent: Jun. 20, 2006

(54) METHOD FOR PRODUCING OPTICAL FILM

(75) Inventors: Kuang-Rong Lee, Pin Chen (TW);
Hung-Yuan Lin, Pin Chen (TW);
Bor-Ping Wang, Pin Chen (TW)

(73) Assignee: Optimax Technology Corporation, Tao Yuan Hsien (TW)

( * ) Notice: Subject to any disclaimer, the term of this patent is extended or adjusted under 35 U.S.C. 154(b) by 0 days.

(21) Appl. No.: 10/867,671

(22) Filed: Jun. 16, 2004

(65) Prior Publication Data

US 2005/0221627 A1    Oct. 6, 2005

(30) Foreign Application Priority Data

Mar. 30, 2004 (TW) .............................. 93108594 A

(51) Int. Cl.
*H01L 21/31* (2006.01)
*H01L 21/469* (2006.01)

(52) U.S. Cl. ...................................... 438/780; 438/781

(58) Field of Classification Search ................ 438/780, 438/781, 725; 264/1.6, 1.7, 173.12; 359/359, 359/584
See application file for complete search history.

(56) References Cited

U.S. PATENT DOCUMENTS

| | | | |
|---|---|---|---|
| 5,509,464 A * | 4/1996 | Turner et al. ............... | 165/80.2 |
| 6,673,425 B1 * | 1/2004 | Hebrink et al. ............. | 428/212 |
| 6,697,195 B1 * | 2/2004 | Weber et al. ............... | 359/359 |
| 6,788,463 B1 * | 9/2004 | Merrill et al. .............. | 359/494 |
| 6,827,886 B1 * | 12/2004 | Neavin et al. ............... | 264/1.6 |
| 6,830,713 B1 * | 12/2004 | Hebrink et al. ............. | 264/1.6 |
| 6,888,675 B1 * | 5/2005 | Ouderkirk et al. .......... | 359/490 |
| 6,891,589 B1 * | 5/2005 | Hata et al. .................. | 349/117 |
| 6,905,220 B1 * | 6/2005 | Wortman et al. ........... | 359/586 |
| 6,916,440 B1 * | 7/2005 | Jackson et al. .......... | 264/288.4 |
| 6,936,209 B1 * | 8/2005 | Jackson et al. .......... | 264/288.4 |

* cited by examiner

*Primary Examiner*—Michael Lebentritt
*Assistant Examiner*—Walter L. Lindsay, Jr.
(74) *Attorney, Agent, or Firm*—Troxell Law Office, PLLC

(57) ABSTRACT

The present invention relates to a method for producing an optical film, the optical film having the same molecule length in X-axis, Y-axis and Z-axis orientation, comprising the steps of: stretching the optical film along the X-axis; fixing the length of the optical film along the Y-axis; heating the optical film to above an extension temperature; shrinking the optical film along the X-axis; stretching the optical film along the Z-axis; and enabling the molecule length of the optical film along the X-axis to be longer than that along the Z-axis while the molecule length of the optical film along the Z-axis is longer than that along the Y-axis.

5 Claims, 2 Drawing Sheets

METHOD FOR PRODUCING OPTICAL FILM

FIELD OF THE INVENTION

The present invention relates to a method for production optical film, especially to a method of producing an optical film by stretching the film in a direction normal to the film surface. The method has the advantages as following: having simplified production procedures with lower manufacturing cost, having no requirement of applying an external electric field or matching with another polymer film, and being capable of precisely controlling the lengths in all axes.

BACKGROUND OF THE INVENTION

A transparent thermoplastic optical polymer can be stretched to achieve a desired phase difference and used as the phase difference film (retardation film) of a TFT-LCD for enabling the light transmitted through the retardation film to have a specific phase and thus increasing the viewing angle of the TFT-LCD.

Three are three conventional methods capable of producing an optical film by stretching the film in a direction normal to the film surface which are described as following:
(1) The first method, as described in the Japanese Patent Kokai (Laid-Open) 5-157911, the U.S. Pat. No. 5,472,538, the U.S. Patent Application Publication US20020063819A1, and the U.S. Patent Application Publication US20020034596A1, stretches an optical sheet constituted by a retardation film and another polymer film such that the retardation film is being stretched in the Z-axis since the shrinkage ratios of different films are different. In this method, however, the axial extension coefficients of each layer have to match with each other and the extending parameters have to be precisely controlled during the extension process. In this regard, the manufacturing cost is relatively high because of the complicated manufacturing process.
(2) The second method, as described in the Japan Patents Kokai (Laid-Open) 3-24502, 3-85519, 3-109508, 4-422-2, and 4-56802, uses an uniaxially stretched polymer optical film with positive intrinsic birefringence attached with an uniaxially stretched polymer optical film with negative intrinsic birefringence to achieve the equivalent effect similar to a Z-axis stretched film. However, the resulting laminate will have worse transmission rate, and the scopes of the application of the method are limited due to the thicker film and the accompanied problems in the optical axis.
(3) The third method, as described in the Japan Patents Kokai (Laid-Open) 2-285303, 5-157911, 7-128523, and 8-248202, plates an optical film with metal or other materials such that the optical film is extended in the Z-axis by applying an external electric field. However, not only the cost is high, the plated conducting metal has to be removed after the stretching.

Accordingly, the conventional methods for producing optical film have at least the disadvantages as following:
1. Supplemental materials are needed in the conventional methods, such as adhering another layer of polymer film or plating a conducting metal, before stretching the optical film along the Z-axis, such that the manufacturing cost is relatively higher and the procedure is more complicated.
2. Axial extension coefficients of each layer have to match with each other in the conventional methods and, the convention methods having too many variables during the stretching process such that it is difficult to control the quality of the stretch optical film precisely.
3. Supplemental materials have to be removed after the stretching process in the conventional methods, which the yield of the LCD panel after attaching the optical film is less than expected causing by the deformation of the optical film in the removal process or the residues of the supplemental materials on the optical film.
4. The optical film possesses residual strain after the stretching processing in the conventional methods that the release of the residual stain will cause incorrect size.

SUMMARY OF THE INVENTION

To overcome the disadvantages of the prior art, it is the primary object of the present invention to provide a method for producing optical film capable of stretching the film in a direction normal to the film without using any supplemental materials such that the manufacturing cost is reduced and the manufacturing process is simplified.

The second object of the present invention is to provide a method for producing optical film that the matching issue of the axial extension coefficients does not have to be considered and the quality of the stretching process can be precisely controlled with just a single controllable parameter.

Another object of the present invention is to provide a method for producing optical film that does not require any process to remove the supplemental materials after the stretching processing, and thus can assure the yield of the LCD panel attaching with the optical film to be free from the problems of the deformation of the optical film or the residues of the supplemental materials.

Yet, another object of the present invention is to provide a method for producing optical film that does not produce residual strain on the optical film after the stretching process, and thus the precision of the size can be assured.

To achieve the above-mentioned objects, the present invention provides a method for producing an optical film, the optical film having the same molecule length in X-axis, Y-axis and Z-axis orientation, comprising the steps of: stretching the optical film along the X-axis; fixing the length of the optical film along the Y-axis; heating the optical film to above an extension temperature; shrinking the optical film along the X-axis; stretching the optical film along the Z-axis; and enabling the molecule length of the optical film along the X-axis to be longer than that along the Z-axis while the molecule length of the optical film along the Z-axis is longer than that along the Y-axis.

Wherein, the first axial stretching in the X-axis includes at least two steps, that is, heating until the temperature of the optical film is above the glass transition temperature of the same; and stretching the optical film along the X-axis.

DESCRIPTION OF THE PREFERRED EMBODIMENT

With the following descriptions and drawings, the objects, features, and advantages of the present invention can be better interpreted.

Figure 1A:
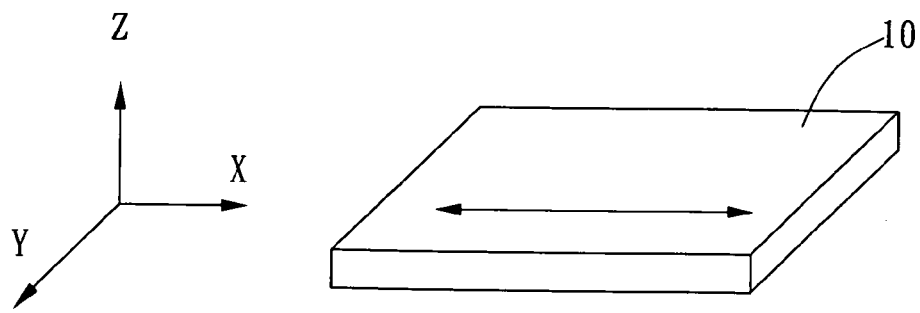
FIG. 1A is a schematic drawing of an original optical film according to a preferred embodiment of the present invention.

Please refer to FIG. 1A, which is a schematic drawing of an original optical film according to a preferred embodiment of the present invention. Wherein, the molecules of the optical film 10 are arranged randomly along each axes before applying any external force that the molecule lengths of the optical film 10 along the X-axis, Y-axis, and Z-axis are identical. Typically, the optical film 10 is made of PC (polycarbonate), PMMA (Poly Methylmethacrylate), cyclic olefin polymer (COP), or other transparent optical polymers. Since these polymers have great transmission rates and durability, they are suitable for many applications, especially for the optical film of the LCD panel. Not only their optical properties meet the demand, but the durability and the strength thereof also achieves the manufacturing requirements for the LCD panel.

Figure 1B:
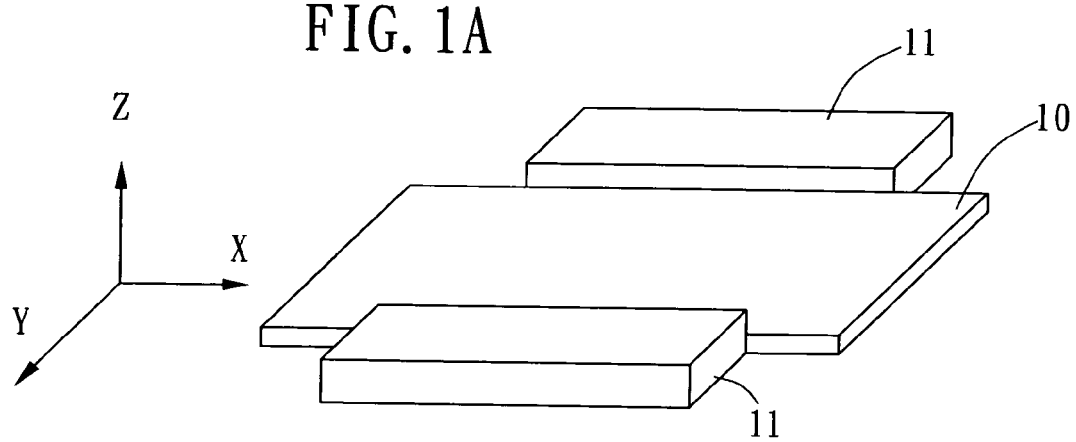
FIG. 1B is a schematic drawing of an optical film being stretched along the X-axis according to a preferred embodiment of the present invention.

Please refer to FIG. 1B, which is a schematic drawing of an optical film being stretched along the X-axis according to a preferred embodiment of the present invention. The optical film 10 can become thermoplastic after being heated up to above a glass transition temperature (Tg). Therefore, the optical film 10 can be drawn along the X-axis while fixing the optical film 10 along the Y-axis with a stationary mount 11. In general, the thickness of the optical film 10 is around 30~150 μm or 40~100 μm. As the optical film 10 extends along the X-axis uniaxially, the thickness and width of the optical thin film 10 will shrink and also the molecule lengths of the optical thin film 10 along the Y-axis and Z-axis will shrink as well. Wherein, the glass transition temperatures (Tgs) of the PC (polycarbonate) and COP are around 140° C., while the glass transition temperature (Tg) of the PMMA (Poly Methylmethacrylate) is at about 100° C.

Figure 1C:
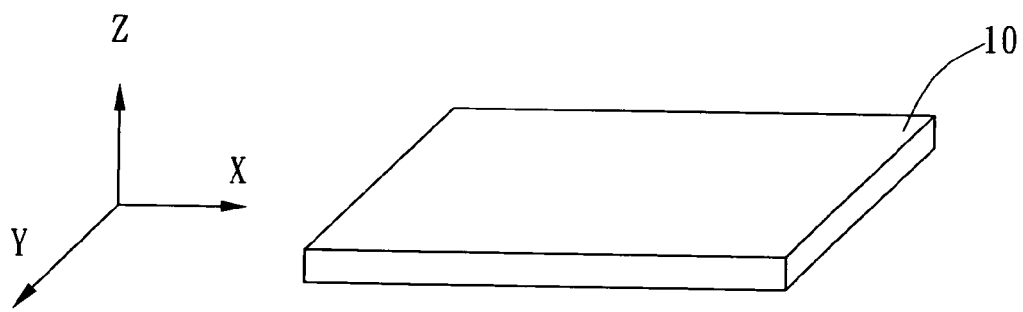
FIG. 1C is a schematic drawing of an optical film being stretched along the Z-axis according to a preferred embodiment of the present invention.

Please refer to FIG. 1C, which is a schematic drawing of an optical film being stretched along the Z-axis according to a preferred embodiment of the present invention. The optical film 10 is heated up to the extension temperature, which is a temperature in an appropriate range above the glass transition temperature of the optical film 10. The extension temperature is about 120° C. if PMMA (Poly Methylmethacrylate) is used as the material for the optical film 10. The extension temperature, however, is about 160° C. if PC (polycarbonate) or COP is used as the material for the optical film 10. While the temperature of the optical film 10 is above the extension temperature, the optical film 10 will shrink along the X-axis and the length of the optical film 10 along the Y-axis is still fixed. In this regard, the optical film 10 will extend along the Z-axis achieving the effect of Z-axis extension that the optical film will have the property of $n_x > n_z > n_y$, in which nz is a refractive index in a direction of a Z axis expressing a direction of the thickness d of the retardation film, nx is a refractive index in a direction of an X axis expressing a direction of the retardation film in a plane perpendicular to the Z axis while the X axis also expresses a direction of the highest in-plane refractive index, and ny is a refractive index in a direction of a Y axis expressing a direction of the retardation film perpendicular both to the Z axis and to the X axis. Therefore, the supplemental materials are not necessary in the process of stretching the optical film 10 along the Z-axis. Moreover, the problem of the residual strain is eliminated since the Z-axis extension of the optical film 10 is processed by releasing the force freely in the present preferred embodiment of the present invention. As the result, the size will not change due to the releasing of the residual strain after the stretching process.

Figure 2:
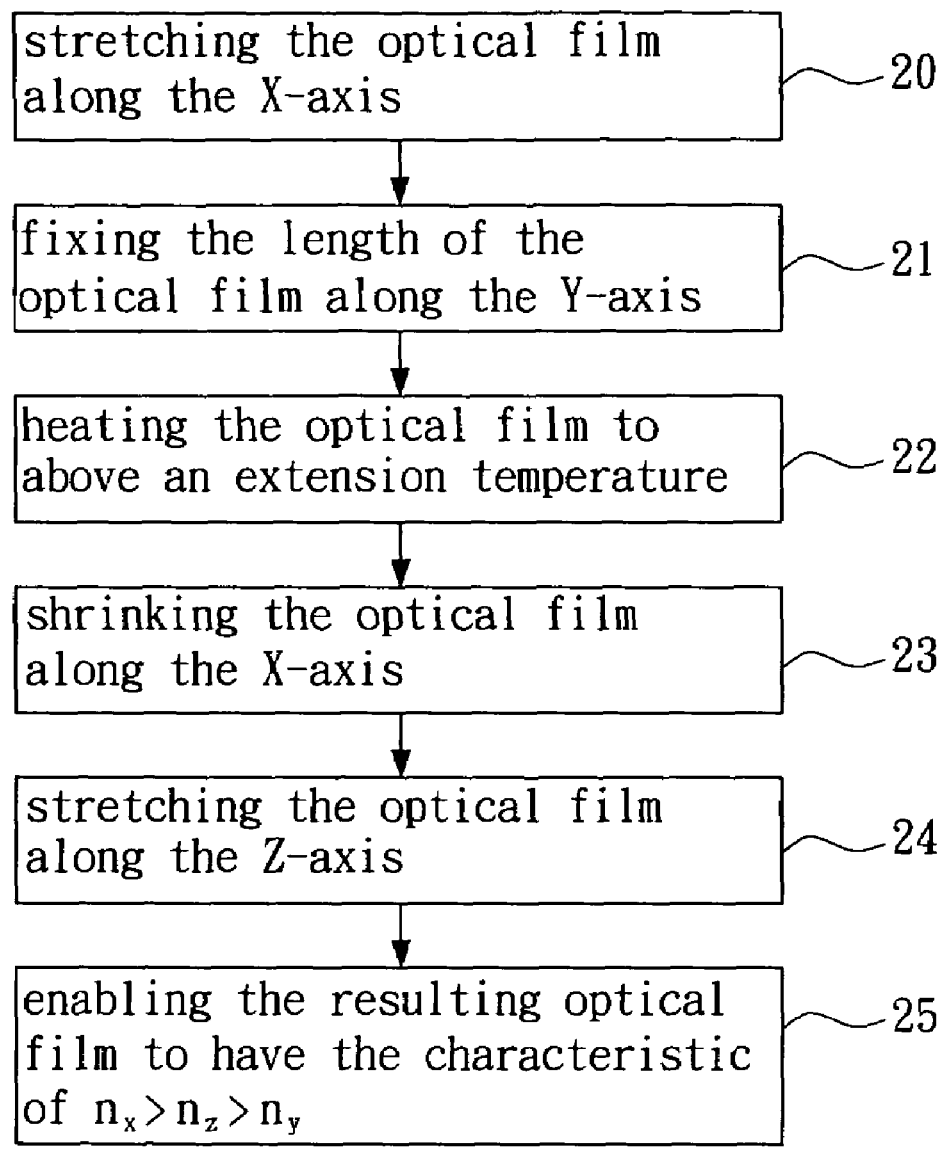
FIG. 2 is a flow chart of the present invention.

Please refer to FIG. 2, which is a flow chart of the present invention. An transparent optical polymer is being used for the optical film of the present invention, wherein the molecule lengths of the optical film along the X-axis, Y-axis, and Z-axis are identical. The process of stretching the optical film 10 along the Z-axis in the present preferred embodiment of the present invention comprises the following steps:

Step 20: stretching the optical film along the X-axis; wherein different temperatures have to be used for the process of stretching the optical film 10 along the X-axis according to different optical film 10 used. For example: if PMMA is used as the material for the optical film and since its glass transition temperature is about 100° C., the processing temperature needs to be about 120° C. that exceeds the glass transition temperature of PMMA. If PC or COP is used as the material of the optical film and since the glass transition temperatures for them are about 140° C., the processing temperature has to be about 160° C. that exceeds the glass transition temperatures of PC or COP. In the other words, the processing temperature of stretching the optical film made of PMMA in X-axis is about 120° C. and the processing temperature of stretching the optical film made of PC or COP in X-axis is about 160° C. The length of the optical film along the X-axis will be increased during the stretching process that the lengths of the optical film along the Y-axis and the Z-axis will be shortened accordingly.

Step 21: fixing the length of the optical film along the Y-axis to achieve a characteristic of $n_x > n_y = n_z$ for the optical film.

Step 22: heating the optical film to exceed an extension temperature as described in Step (21), which is about 160° C. for the PC or COP and is about 120° C. for the PMMA. Without any thermal treatment after the stretching, the optical film will shrink naturally if it is being heated up to a temperature exceeding the extension temperature. Therefore, to achieve the desire temperature, 160° C.~180° C. is enough for the process with PC or COP while 120° C.~140° C. is enough for the PMMA.

Step 23: shrinking the optical film along the X-axis; wherein since the length of the optical film along the Y-axis is fixed, the length of the optical film along the X-axis will shrink naturally that, however, $n_x$ is still the largest among the three.

Step 24: stretching the optical film along the Z-axis; wherein, since the length of the optical film along the X-axis is contracted and the length along the Y-axis is fixed, the optical film will be thickened along the Z-axis and releasing the residual strain in the optical film assuring the precision of the size of the optical film.

Step 25: enabling the resulting optical film to have the property of $n_x > n_z > n_y$, wherein after the processing of the present preferred embodiment, the length of the optical film along the Z-axis that originally equals to the length along the Y-axis becomes longer than the length along the Y-axis ($n_z > n_y$) and a Z-plate is obtained, which is an optical film with the property of $n_x > n_z > n_y$.

In summary, the method for producing optical film of the present invention capable of stretching the film in a direction normal to the film without using any supplemental materials, and enabling the quality of the stretching process can be precisely controlled with just a single controllable parameter, and requiring no process to remove the supplemental materials after the stretching processing such that can assure the yield of the LCD panel attaching with the optical film to be free from the problems of the deformation of the optical film or the residues of the supplemental materials. These preferred embodiments are however not the limited scope of the present invention. For examples: production methods of optical thin films with different materials, different types of stationary mount, different heating temperatures, and etc. Any appropriate and small variation and adjustment based on the appended claims that still possess the merit of the present invention should be considered within the scope and the spirit of the present invention.

The present invention has the novelty that the related technique has not been disclosed in the field of the prior art; the technique of the present invention is feasible to resolve the existing problems in the field that is advanced without referring to the prior art; therefore, it has met the requirements of patent filing.

What is claimed is:

1. A method for production optical film, the optical film having the same molecule length in X-axis, Y-axis and Z-axis orientation, comprising the steps of:
   stretching the optical film along the X-axis;
   fixing the length of the optical film along the Y-axis; and
   heating the optical film to above an extension temperature, after heating the optical film to above the extension temperature, the method further comprising the steps of:
   shrinking the optical film along the X-axis; and
   stretching the optical film along the Z-axis.

2. The method for production optical film according to claim 1, after stretching the optical film along the Z-axis, the method further comprising the steps of:
   enabling the molecule length of the optical film along the X-axis to be longer than that along the Z-axis while the molecule length of the optical film along the Z-axis is longer than that along the Y-axis.

3. A method for production optical film, the optical film having the same molecule length in X-axis, Y-axis and Z-axis orientation, comprising the steps of:
   stretching the optical film along the X-axis;
   fixing the length of the optical film along the Y-axis; and
   heating the optical film to above an extension temperature, wherein said optical film is made of a transparent optical polymer, wherein said transparent optical polymer is cyclic olefin polymer (COP), wherein the temperature above the extension temperature of said cyclic olefin polymer (COP) is in a range between 160° C.–180° C.

4. A method for production optical film, the optical film having the same molecule length in X-axis, Y-axis and Z-axis orientation, comprising the steps of:
   stretching the optical film along the X-axis;
   fixing the length of the optical film along the Y-axis; and
   heating the optical film to above an extension temperature, wherein said optical film is made of a transparent optical polymer, wherein said transparent optical polymer is polycarbonate (PC), wherein the temperature above the extension temperature of said polycarbonate is in a range between 160° C.–180° C.

5. A method for production optical film, the optical film having the same molecule length in X-axis, Y-axis and Z-axis orientation, comprising the steps of:
   stretching the optical film along the X-axis;
   fixing the length of the optical film along the Y-axis; and
   heating the optical film to above an extension temperature, wherein said optical film is made of a transparent optical polymer, wherein said transparent optical polymer is Poly Methylmethacrylate (PMMA), wherein the temperature above the extension temperature of said Poly Methylmethacrylate (PMMA) is in a range between 120° C.–140° C.

* * * * *